(12) United States Patent
Gilligan et al.

(10) Patent No.: US 10,999,131 B2
(45) Date of Patent: May 4, 2021

(54) METHOD AND SYSTEM FOR DETECTING ABNORMALITIES IN NETWORK ELEMENT OPERATION

(71) Applicant: Arista Networks, Inc., Santa Clara, CA (US)

(72) Inventors: Robert E. Gilligan, Santa Clara, CA (US); Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 55 days.

(21) Appl. No.: 16/576,443

(22) Filed: Sep. 19, 2019

(65) Prior Publication Data
US 2020/0067804 A1     Feb. 27, 2020

Related U.S. Application Data (63) Continuation of application No. 15/484,274, filed on Apr. 11, 2017, now Pat. No. 10,491,460.

(60) Provisional application No. 62/323,448, filed on Apr. 15, 2016.

(51) Int. Cl.
H04L 12/24 (2006.01)
H04L 12/26 (2006.01)

(52) U.S. Cl.
CPC ............ *H04L 41/069* (2013.01); *H04L 43/06* (2013.01); *H04L 43/062* (2013.01); *H04L 43/067* (2013.01); *H04L 43/0817* (2013.01); *H04L 43/0876* (2013.01); *H04L 43/106* (2013.01); *H04L 43/50* (2013.01)

(58) Field of Classification Search
CPC ....... H04L 41/069; H04L 43/50; H04L 43/06; H04L 43/0817
See application file for complete search history.

(56) References Cited

U.S. PATENT DOCUMENTS

| | | | |
|---|---|---|---|
| 9,160,644 B1* | 10/2015 | Soffer | H04L 43/50 |
| 2004/0015762 A1 | 1/2004 | Klotz | |
| 2015/0281015 A1 | 10/2015 | Griffith | |
| 2017/0263332 A1 | 9/2017 | Kapoor | |
| 2019/0253335 A1* | 8/2019 | Yadav | H04L 43/50 |

* cited by examiner

*Primary Examiner* — Austin J Moreau
(74) *Attorney, Agent, or Firm* — Chamberlain, Hrdlicka, White, Williams & Aughtry (57) ABSTRACT

A method for detecting abnormalities in network element operation. The method includes monitoring at least a portion of the network element for abnormalities and making a determination that an abnormality exists, in response to the monitoring, and based on the determination, tracking the abnormality. An abnormality includes a measured performance that deviates from a nominal performance, but that does not cause erroneous behavior of the network element.

16 Claims, 2 Drawing Sheets

FIG. 1

FIG. 2 ns of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

METHOD AND SYSTEM FOR DETECTING ABNORMALITIES IN NETWORK ELEMENT OPERATION

CROSS-REFERENCE TO RELATED APPLICATIONS

This application claims priority to U.S. Provisional Patent Application No. 62/323,448 filed Apr. 15, 2016, the entire disclosure of which is hereby expressly incorporated by reference herein.

BACKGROUND

Information technology (IT) networks may include network elements such as routers, switches and multi-layer switches. Various functionalities may be implemented by a network element. A network element may experience abnormalities that, during regular operation of the network element may go undetected, but that may eventually cause an error in a functionality of the network element. Accordingly, these abnormalities pose failure risks.

SUMMARY

In general, in one aspect, the invention relates to a method for detecting abnormalities in network element operation. The method includes monitoring at least a portion of the network element for abnormalities and making a determination that an abnormality exists, in response to the monitoring, and based on the determination, tracking the abnormality. An abnormality includes a measured performance that deviates from a nominal performance, but that does not cause erroneous behavior of the network element.

In general in one aspect, the invention relates to a network element. The network element includes functionality modules and at least one abnormality detection module. The at least one abnormality detection module monitors at least one of the functionality modules for abnormalities. The at least one abnormality detection module makes a determination that an abnormality exists in response to the monitoring, and based on the determination, tracks the abnormality. An abnormality includes a measured performance that deviates from a nominal performance, but that does not cause erroneous behavior of the network element.

In general, in one aspect, the invention relates to a non-transitory computer readable medium including instructions that enable a network element to monitor at least a portion of the network element for abnormalities and make a determination that an abnormality exists in response to the monitoring; and based on the determination, track the abnormality. An abnormality includes a measured performance that deviates from a nominal performance, but that does not cause erroneous behavior of the network element.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1 and 2, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for detecting failure risks in network elements. A network element, e.g., a router, switch or a multi-layer switch, in accordance with one or more embodiments of the invention, may be operating over an extended period of time. A network element may operate, for example, for months or even years without being rebooted. Over such an extended period of time, abnormalities that may go undetected over shorter time intervals, e.g. when performing a quality control test routine, may eventually cause an error. Such an error may result in partial or complete loss of the network element's functionalities. For example, in a router or switch, packets may be dropped, rather than being processed. The underlying issue, that may cause an error over time, may not be detectable under most regular operating conditions. Standardized test routines, e.g., burn-in tests, quality control routines, etc. may not be executed over a sufficiently long time interval for the abnormality to cause a detectable error.

In one or more embodiments of the invention, an abnormality is detectable prior to causing, an error or a failure. An abnormality may thus serve as a predictor of a potential future error or failure of the network element. Particular abnormalities may be indicative of a particular problem. Such abnormalities may not necessarily measurably affect the overall performance of the network element, yet these abnormalities may be measurable. For example, a very small delay may be detectable using a timer, while the small delay does not cause a noticeable slowdown of the network element's functionalities. A network element, in accordance with one or more embodiments of the invention, is therefore equipped with an abnormality detection module, configured to detect abnormalities that may be indicative of an underlying problem. The abnormalities, when interpreted by a network element expert, may allow the diagnosis of the problem. A description of various embodiments of the abnormality detection is provided below.

In one or more embodiments of the invention, abnormalities may sporadically appear and/or may gradually develop, over time, in order to accelerate the appearance and/or development of abnormalities, the network element may be put under stress. Stress may be imposed, for example by rapidly executing certain operations, by inducing excessive consumption of resources, etc. A description of methods for imposing stress on the network element, in accordance with one or more embodiments of the invention, is provided below.

A combination of simultaneously imposing stress on a network element under test and detecting abnormalities that may have been induced by the imposed stress, in accordance with one or more embodiments of the invention, enables identification of abnormalities within limited time. Accordingly, an abnormality with the potential of eventually causing an error may be detected within a relatively short period of time.

Figure 1:
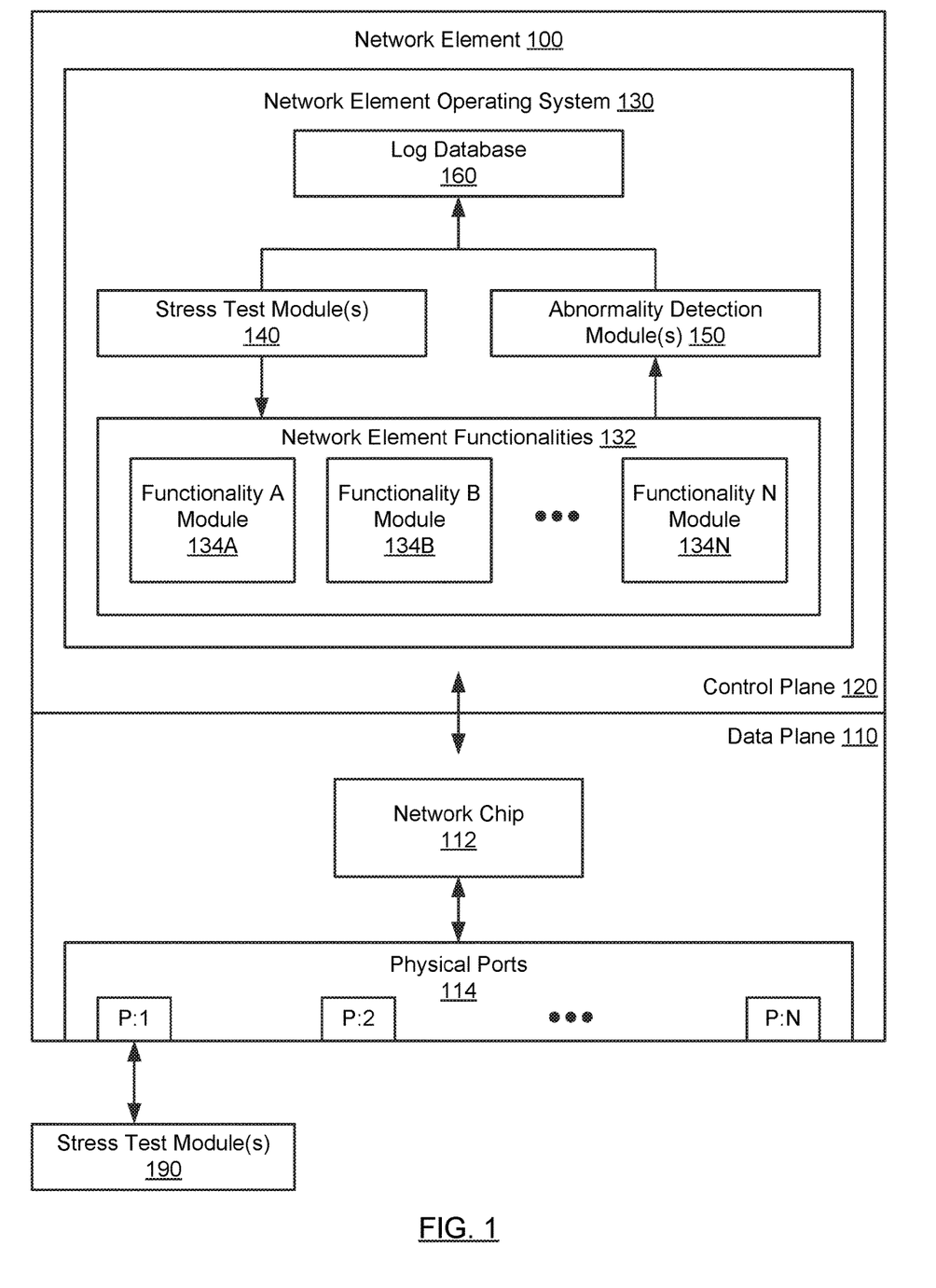
FIG. 1 shows a network element, in accordance with one or more embodiments of the invention.

FIG. 1 shows a network element, in accordance with one or more embodiments of the invention. The network element (100) may be a router, a switch or a multilayer switch. In one or more embodiments of the invention, the network element (100) includes executable instructions (stored on a non-transitory computer readable medium (not shown)) and hardware (e.g., a processor, memory, persistent storage, etc. (not shown)), configured to receive data packets from other network elements or computing devices, process the data packets, and send the data packets to other network elements or computing devices.

In one embodiment of the invention, the network element (100) includes a data plane (110) and a control plane (120). The data plane (110) may include one or more network chips (112) that process incoming data packets, identify a destination device for each incoming data packet, and send the data packet to the destination device. The identification of the destination device may include routing and/or switching operations and the destination device may be another network element or a computing device such as a server, a workstations, etc.

Incoming and outgoing data packets may be received and sent, respectively, via the physical ports (114) that interface with the network chip(s) (112). The physical ports may be, for example, electrical and/or optical Ethernet ports.

The network element (100), in accordance with one or more embodiments of the invention, further includes a network element operating system (OS) (130) executing in the control plane (120). The control plane (120), in accordance with an embodiment of the invention, governs the behavior of the network element, e.g., the switching and/or routing decisions that are being made in the data plane.

The network element OS (130) may execute on a processor in the control plane (120), e.g., a central processing unit, that may interface with volatile and/or non-volatile memory such as dynamic-random-access memory, flash storage, a hard disk drive, etc. Alternatively, the network element OS (130) may execute on a virtual machine, hosted in the control plane. In one embodiment of the invention, the network element OS (130) includes a kernel (not shown) that controls core functionalities of the network element OS. The kernel may provide an interface between the network element hardware and the network functionality modules (134A-134N), described below, for example, by controlling input/output operations such as file system access, managing memory, etc.

Figure 2:
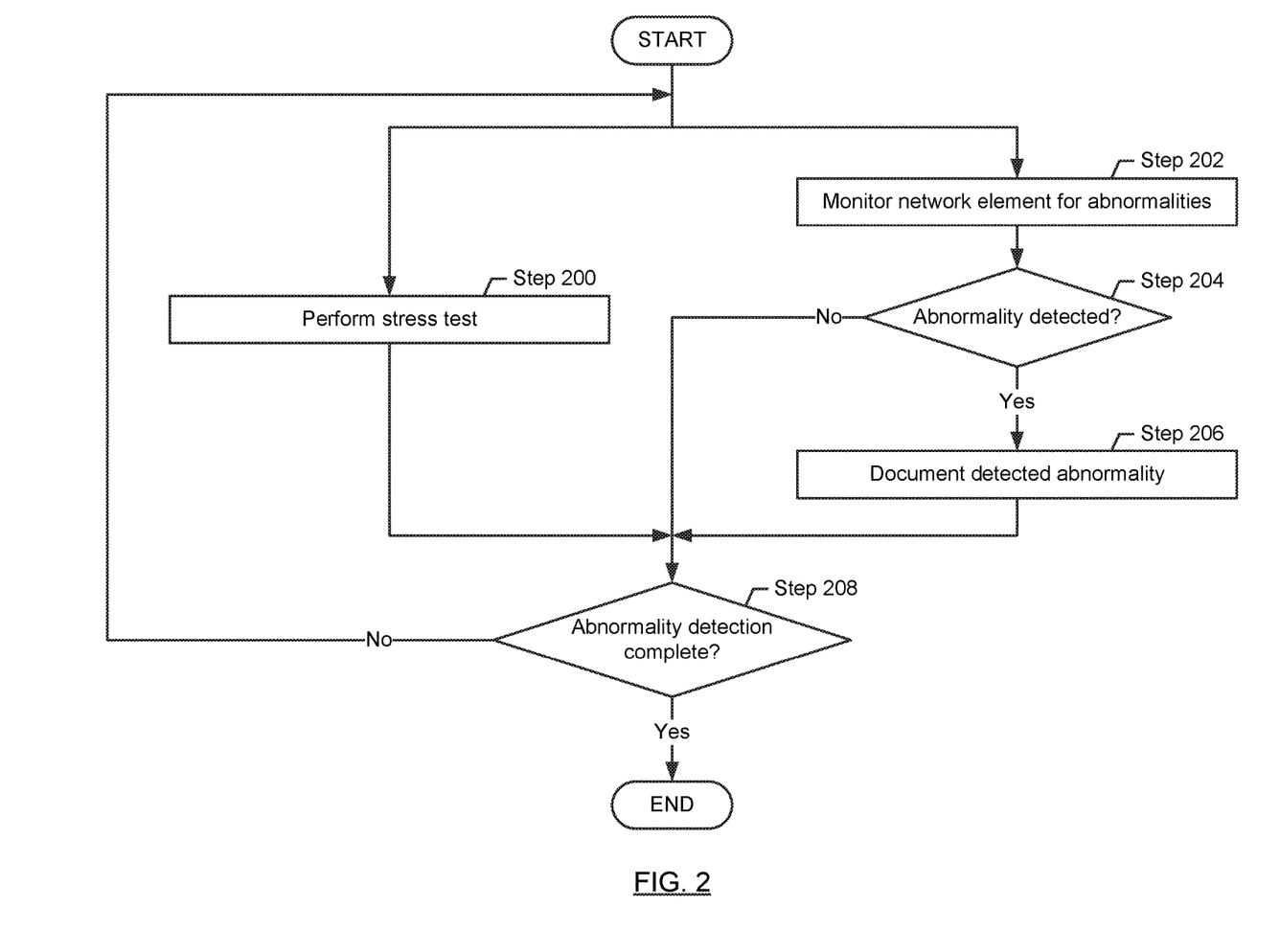
FIG. 2 shows a flowchart, in accordance with one or more embodiments of the invention.

In one or more embodiments of the invention, the control plane (120) further accommodates components that implement additional functionalities to implement the methods shown in FIG. 2. More specifically, methods for detecting failure risks in network elements may be implemented in the network element control plane (120).

In one embodiment of the invention, the network element provides certain functionalities, e.g., a routing functionality. The network element functionalities (132) are implemented by one or more functionality modules (134A-134N) in the control plane (120) of the network element (100). The functionality modules (134A-134N) determine the availability of features of the network element. For example, a functionality module may provide routing functionality, e.g., based on the border gateway protocol (BGP). Such a network element may thus operate as a router or multi-layer switch. Further, a network element that includes a functionality module that implements virtual extensible local area network VXLAN support may provide network virtualization, which may enable the network element to operate as a VXLAN tunnel endpoint (VTEP). Other functionalities may provide support for administrative features, e.g., logging services, communication services, enabling the network element to communicate with other network elements or computing devices, etc.

Those skilled in the art will appreciate that the network functionality modules (134A-134N) are not limited to providing particular functionalities. Any type of service, protocol or feature related to core functions of a network element (e.g., routing and switching functions), optional functions and/or administrative functions may be implemented by functionality modules. These functionalities may include, but are not limited to, (e.g., MLAG, LACP, VXLAN, LLDP, Tap Aggregation, Data Center Bridging Capability Exchange, ACL, VLAN, VRRP, VARP, STP, OSPF, BGP, RIP, BDF, MPLS, PIM, ICMP, IGMP, etc.). Some of these functionality modules may always be present, other functionality modules may be optionally be present.

In one or more embodiments of the invention, the control plane (120) of the network element (100) includes one or more stress test modules (140,190). A stress test module, in accordance with an embodiment of the invention, includes one or more functions configured to impose stress on one or more of the functionality modules (134A-134N). Imposing stress, in accordance with an embodiment of the invention, includes the use of at least one resource of the network element. The use may be excessive, e.g. it may exceed the use of the resource typically observed under regular operating conditions of the network element. Stressing the functionality modules may reveal measurable abnormalities in the performance of one or more functionality modules, within limited time. Resources targeted by the stress test may include network element processor time, network element volatile and/or non-volatile memory, network element input/output interface bandwidth, etc. Different types of stress test modules, including stress test modules (190) that are external to the network element and stress test modules (140) that are internal to the network element, may be employed.

External stress test modules may be, for example, dedicated testing equipment or other network elements that are operatively connected to the network element (100), e.g., via one of the physical ports (114). The external stress test modules (190), in accordance with an embodiment of the invention, are configured to generate a load or a combination of loads in the network element (100) by performing network activities that involve the network element (100). These external stress test modules may thus stress the network element functionality modules that are involved in handling the interaction with the external stress test modules (190).

In contrast, an internal stress test module (140) may be software executing in the control plane (120) of the network element (100) itself. The internal stress test modules may target network element functionality modules that would be difficult or impossible to stress by externally applied loads. For example, an internal stress the module may apply stress to a file system of the network element (100) by rapidly and frequently-accessing the file system.

A network element (100) under test may undergo one or more stress tests over a set period of time. The chosen period of time may be minutes, hours, or even weeks or months, depending on the stress test being performed. However, in comparison with the expected continuous operation of the network element, the chosen period of time for stress testing may be short.

A stress test being performed on a network element under test may be logged, for example, by documenting the type of stress test, the duration of the stress test and/or parameters of the stress test in the log database (160).

Stress tests, in accordance with one or more embodiments of the invention, are chosen to cause stress beyond regular operating conditions of the network element. One may therefore expect to observe abnormalities at a faster pace than under regular operating conditions. A variety of stress tests may exist. The stress tests to be performed on a network element may be specific to the functionality module(s) (134) to be tested. For example, while a functionality module that primarily performs file system operations may be tested with a heavy load of file system operations, a functionality module that is responsible for maintaining a routing table may be tested by artificially inducing frequent route flaps.

A set of exemplary stress tests is subsequently described.
Address Resolution Protocol (ARP) Cache Thrash The ARP cache thrash stress test, in accordance with an embodiment of the invention, generates a high processing load on the network element under test by stressing the ARP cache. Under regular operating conditions, the ARP cache reduces network bandwidth consumption and communication latencies by caching Internet protocol (IP) addresses and corresponding hardware addresses (e.g., media access control (MAC) addresses), thus enabling the network element to externally obtain the hardware address corresponding to an IP address from the ARP cache, rather than having to send an ARP request to obtain this information. If an ARP cache thrash occurs, the resolution of a hardware address may not be performed via the cache, e.g., because the necessary ARP cache entry was overwritten by another ARP cache entry, and may therefore need to be performed via an ARP request. In the ARP cache thrash stress test, ARP cache thrashes may be artificially induced.

Cache thrashes may be induced by the stress test module (i) instructing the network element to send packets to a large number of non-existent on-link destinations (i.e., to non-existent destinations in the same subnet), thus causing the ARP cache to fill up and forcing garbage collection to be run repeatedly; (ii) instructing the network element to send packets to a large number of existing on-link destinations, thus also causing the ARP cache to fill up and forcing garbage collection to be run repeatedly; and (iii) providing proxy ARP packets to the network element (i.e., packets for which the network element performs as an ARP proxy), thus filling up the ARP cache and forcing garbage collection to be run repeatedly.
Internet Control Message Protocol (ICMP) Unreachable Generation The ICMP unreachable generation stress test, in accordance with an embodiment of the invention, generates a high processing load on the network element under test by requiring resolution of destinations and subsequent generation of "unreachable" messages when the resolution fails. An ICMP message may be issued, for example, when the resolution of a destination network, a destination host, a destination protocol or a destination port is unreachable.

The generation of ICMP "unreachable" messages may be induced by the stress test module instructing the network element to send packets at a high rate to destinations for which there are no routes. As a result, the network element, after detecting that no suitable routes exist, may be forced to generate ICMP "unreachable" messages.
Multicast Thrash The multicast thrash stress test, in accordance with an embodiment of the invention, generates a high processing load on the network element under test by requiring packets to be sent to be processed manually.

Multicast thrashes may be induced by the stress test module instructing the network element to: (i) send packets to unresolved multicast destinations, thereby forcing the network element to process every packet; and (ii) send packets that are configured to be software-forwarded to resolved multicast destinations. Software-forwarding may be induced, for example, by including options in the packet to be switched that the network chip is unable to process, and/or by providing a packet to the switch that is too large to be forwarded and therefore requires fragmentation. In the above cases, the network chip is unable to directly process the packet and forwards the packet to the processor of the network element in order to process the packet. While under regular operating conditions the processing of packets by the network element processor may be rare, the multicast thrash test may require frequent processing by the network element processor, thus generating a high processing load. Depending on the task to be performed by the network element processor when processing the packet (e.g., processing packet options, fragmenting the packet, and/or looking up a multicast route), different types of stress may be induced.
IPv4 and IPv6 Kernel Forwarding Information Base (FIB) Thrash The IPv4/IPv6 kernel FIB thrash stress test, in accordance with an embodiment of the invention, generates a high processing load on the network element under test. IPv4/IPv6 kernel FIB thrashes may be induced by the stress test module adding large numbers of IPv4 and/or IPv6 routes to the kernel's FIB, and by subsequently deleting those routes. The process of adding and deleting routes may be repeated indefinitely, thus continuously consuming memory and generating a high processing load.
Virtual Local Area Network (VLAN) Thrash The VLAN thrash stress test, in accordance with an embodiment of the invention, generates a high processing load on the network element under test. VLAN thrashes may be induced by the stress test module repeatedly creating and deleting VLAN interfaces at a high rate.
Software Forwarding Load The software forwarding load stress test, in accordance with an embodiment of the invention, generates a high processing load on the network element under test by forcing the network element to software-forward packets at a high rate. Packets may be custom-crafted to require software forwarding. As previously described with reference to the multicast thrash stress test, software forwarding may be induced, for example, by including options in the packet to be switched that the network chip is unable to process, and/or by providing a packet to the switch that is too large to be forwarded and therefore requires fragmentation. Software forwarding loads may be generated by the stress test module instructing the network element to send the custom-crafted packets to (i) unicast destinations; (ii) multicast destinations with no members; or (iii) multicast destinations with several members. While in the above cases, the network chip is unable to directly process the packet and is required to forward the packet to the processor of the network element in order to process the packet, the use of (iii) may cause an extra load because each packet must, in addition, be duplicated several times to send a copy of each packet to every member.

Network Configuration Load

The network configuration load stress test, in accordance with an embodiment of the invention, generates a high processing load on the network element under test by performing network configuration operations that are known to be computationally expensive, thus leaving fewer resources for other functions that run in the control plane. The network configuration operations may include, for example, creating and deleting interfaces and adding and deleting IPv4 and IPv6 addresses to interfaces. These functions may be performed repeatedly, at a high rate. The load exercises in particular code paths that are single-threaded, which on a multi-processor system, may severely impact system performance.

Rapid Link Flapping

The rapid link flapping stress test, in accordance with an embodiment of the invention, generates a high processing load on the network element under test by requiring the network element to handle the rapidly flapping links.

Although flapping links may typically be caused by layer 1 issues such as cabling problems, duplex mismatch, etc., the stress test module may artificially induce the flapping of selected links. The link flapping may trigger a chain of events in the network element attempting to address the appearance/disappearance of other devices, connected via the flapping links.

File System Thrash

The file system thrash test, in accordance with an embodiment of the invention, generates a high processing load on the network element under test and may cause interactions with other functionalities that attempt to read and/or write to the file system.

File system thrashes may be induced by the stress test module by creating, writing and/or deleting many files at a high rate. These activities may result in a significant number of dirty pages for data that has not yet been written to the storage device where the file system is located. The effect may be particularly pronounced if a large number of small files, is written to and read from the file system, repeated indefinitely.

One skilled in the art will recognize that although the above-described stress tests target particular functionality modules of the network element to cause stress conditions, the effects of the stress tests may reach beyond these functionality modules and may thus have the potential to trigger a variety of abnormalities in the operation of the network element across different functionality modules of the network element.

Further, while the above paragraphs describe a set of exemplary stress tests, one skilled in the art will also appreciate that other types of stress tests may be implemented, without departing from the invention. A stress test, in accordance with one or more embodiments of the invention, may be any function that imposes one or more load conditions on one or more functionality modules of the network element. In addition, combinations of stress tests may be executed simultaneously and/or consecutively to generate a broad range of stress conditions.

In one or more embodiments of the invention, the control plane (120) of the network element (100) includes an abnormality detection module (150). The abnormality detection module, in accordance with an embodiment of the invention, includes one or more functions configured to detect abnormalities based on measurable deviations from a specified nominal performance. A nominal performance may be, for example, a specified maximum amount of memory to be used by a particular process. If the actual amount of memory consumed by the process exceeds the specified maximum amount of memory, an abnormality is detected. Abnormalities may also correspond to elongated processing times, unusually long blocking of resources, etc. In one embodiment of the invention, the abnormality detection module (150) is configured to detected small abnormalities that may not cause an error in the operation of the network element and may not be directly detectable based on the operating performance of the network element. Various abnormality detection modules are subsequently described below.

While FIG. 1 shows abnormality detection modules (150), separate from the functionality modules (134A-134N), an abnormality detection module may be a component of a functionality module, without departing from the invention.

Abnormality detection modules, in accordance with one or more embodiments of the invention, may be executed while the network element is exposed to stress conditions, generated by a stress test module and/or during regular operation of the network element, when no stress test modules are active.

Abnormality detection modules, in accordance with an embodiment of the invention, report detected abnormalities, e.g., in the log database (160). A log entry may include the type of the detected abnormality, a timestamp, and/or a snapshot of potentially relevant other variables, parameters, states, etc. of the network element. A log entry may further include backtrace information to facilitate debugging efforts. The logged backtrace information and other information to be logged may be configurable.

A set of abnormalities and abnormality detection modules, configured to detect the abnormalities, is subsequently described.

Blocked Task Detection

The blocked task detection module, in accordance with an embodiment of the invention, detects processes that are blocked in the kernel in an uninterruptible state for a long period of time. This may occur, for example, when another process applies an RTNL lock for an excessive amount of time, as described below under "Prolonged Mutex Hold Detection."

The blocked task detector may provide a warning if a task has been hung for a relatively short period of time (e.g., 2 seconds) and further may trigger an alert when a task is blocked for a long period of time (e.g., 5 minutes). A timer may be used to track blocked tasks. When a task is blocked for a duration of time exceeding a specified threshold, a log record may be generated. The log record for a blocked task warning may include, but is not limited to, a time of occurrence, a process identifier (PID) of the blocked process, a name of the blocked process, an address that the blocked process is sleeping at, backtrace data obtained at the time the process was blocked, and a total time that the process has been blocked. In one embodiment of the invention, the blocked task detector is configurable. For example, time thresholds for the detection of blocked tasks may be specified, certain tasks may be included/or excluded from detection, etc.

Prolonged Link Aggregation Control Protocol (LACP) Transmit Interval Detection

The prolonged LACP transmit interval detection module, in accordance with an embodiment of the invention, detects the sending of LACP packets at intervals greater than the intended LACP interval (e.g., one second). Prolonged LACP transmit intervals may indicate problems that are not confined to the LACP agent, i.e., the root cause of the delay may be an abnormality elsewhere in the network element. The prolonged LACP transmit interval detection module may thus enable detection of a broad set of abnormalities, across the network element. A log record may be generated when a prolonged LACP transmit interval is detected. In one embodiment of the invention, the prolonged LACP transmit interval detection module is configurable. For example, time thresholds for the detection of prolonged transmit time intervals may be specified.

Prolonged Mutual Exclusion (Mutex) Hold Detection

The prolonged mutex hold detection module, in accordance with an embodiment of the invention, detects processes holding a mutex lock (e.g., the routing netlink (RTNL) lock) for an excessively long period of time. While processes may commonly hold a mutex lock, such as the RTNL lock, for brief periods of time, holding a mutex lock for a prolonged period of time may delay other processes that are waiting for that lock, which may lead to undesirable behavior such as timeouts.

The prolonged mutex wait time detector may provide a warning if a process has been holding a mutex lock, e.g., the RTNL lock, for a prolonged time (e.g., for more than one or a few seconds), thus potentially preventing other processes from executing. A timer may be used to track mutex times, including RTNL lock times. When an excessively long mutex interval is detected, a log record may be generated. The log record for a prolonged mutex wait time may include, but is not limited to, a time of occurrence, a process identifier (PID) of the process holding the mutex lock, a name of the process holding the mutex lock, and backtrace information obtained at the time when the process returns the lock. In one embodiment of the invention, the prolonged mutex wait time detector is configurable. For example, time thresholds for the detection of mutex processes may be specified, certain processes may be included/or excluded from detection, etc. Those skilled in the art will recognize that even though the mutex hold detection is described for an RTNL lock, any other type of mutex hold may additionally or alternatively be detected, without departing from the invention.

Watchdog

The watchdog detection module, in accordance with an embodiment of the invention, detects the absence of a periodic watchdog punch signal.

The watchdog detection module may be a hardware component configured to measure the time interval between consecutive watchdog punches.

The watchdog may provide a warning if a watchdog punch signal is overdue, e.g. after the punch signal interval is exceeded by 50%. The warning may be logged. If no punch signal is seen for even longer time intervals, e.g., 45 seconds, a reboot may be initiated. Missing watchdog punches may be caused, for example, under low memory conditions which may cause excessive thrashing, thus preventing a punch signal-generating process to obtain timely memory access.

The periodic punch signal may be a pulse, e.g., a pulse emitted every 2 seconds by the punch signal-generating process. In one embodiment of the invention, the watchdog detection module is configurable. For example, the frequency of the periodic punch signal and/or the detection threshold for triggering a warning and/or a reboot may be specified.

High Task Memory Consumption Detection

The high task memory consumption detection module, in accordance with an embodiment of the invention, detects excessive memory consumption. A warning may be issued and/or logged, for example, if a particular task consumes more than a certain percentage of the total available memory and/or if the task consumes more than a particular amount of memory, e.g., measured in megabytes. The resident set size (RSS) of the task may be used to assess memory consumption.

In one embodiment of the invention, the high task memory consumption detector is configurable. For example, memory consumption thresholds may be specified. Multiple task-specific memory consumption thresholds or a single memory consumption threshold may be configured. The threshold may be specified as an absolute amount of memory, or as percentage of the available memory.

High Kernel Object Count Detection

The high kernel object count detection module, in accordance with an embodiment of the invention, detects excessive object allocation out of kernel memory. For example, an excessive number of "skbuffs" may be used for network-related operations and/or may be put onto a socket queue.

The high kernel object count detection module may generate a log entry when a large number of kernel objects (e.g., "skbuffs") are allocated. Under regular operating conditions, the network element may not need more than a few thousand or tens of thousands of kernel objects, e.g., "skbuffs" at once. Accordingly, a significantly higher number of kernel objects may be indicative of an abnormality. The number of kernel objects and the types of kernel objects that trigger a log entry may be configurable.

Process Starvation Detection

The process starvation detection module, in accordance with an embodiment of the invention, detects situations where a process is runnable but only gets a low number of CPU cycles, e.g., because the CPU is occupied with handling a high rate of interrupts. The cause may be, for example, other processes triggering software interrupts at a high rate. When the starvation persists for an extended period of time, the process may be impacted. For example, the process may miss heartbeats and may be killed by a process manager. The process starvation detection module may be a component of the operating system that may keep track of the state of multiple or all executing processes over a short time interval (e.g., 2 second). If the process starvation detection module detects a process that was runnable (i.e., ready and able to run) for the entire time interval, but only ran less than a small percentage (e.g., 10%) of that time interval, a log entry may be generated. The monitored time interval and the detection threshold may be configurable.

Temporary Hard and/or Soft Lockup Detection

The temporary hard and/or soft lockup detection module, in accordance with an embodiment of the invention, detects temporary hard and/or soft lockups, resulting, for example, from bugs that cause the CPU or the kernel, respectively to remain in kernel mode for a prolonged time. Unlike permanent hard and/or soft lockups that may cause a system to crash, the system may recover from temporary hard and/or soft lockups The soft lockup detection module may rely on a timer interrupt that fires periodically (e.g., every 4 seconds). When the timer fires, the system may assess whether the processor is in a soft lockup condition. If a soft lockup is detected, a log entry may be generated. Once the system detects that the processor has left the soft lockup state, a second log entry may be generated. The second log entry may document the duration of the lockup.

The hard lockup detection module may rely on a non-maskable interrupt that fires periodically (e.g., every 1 second). Analogous to the soft lockup detection, when the timer fires, the system may assess whether the processor is in a hard lockup condition. If a hard lockup is detected, a log entry may be generated. Once the system detects that the processor has left the hard lockup state, a second log entry may be generated. The second log entry may document the duration of the lockup.

In one embodiment of the invention, the temporary hard and/or soft lockup detector is configurable. For example, temporary soft and hard lockup thresholds may be tunable, and/or backtrace information to be logged may be configurable.

Continuing with the discussion of the network element of FIG. 1, in one or more embodiments of the invention, the network element includes a log database (160). The log database may be hosted in the control plane (120) of the network element. The log database, in accordance with an embodiment of the invention, stores log entries received from the stress test module (140) and/or the abnormality detection module (150). The log database may be implemented using any format suitable for the storage of log messages. The log database may be, for example, a text file. The log database may be stored in non-volatile or volatile memory, e.g. on a hard disk drive or in RAM.

In one embodiment of the invention, the log database is separate from other log records that archive other log messages, e.g., log messages generated by the functionality modules (134). The log database (160) may be stored in a separate location that may not be known to a user of the network element. The log database (160) may thus be hidden, for example, by locating it in a directory that is not typically used for storing log messages.

One skilled in the art will recognize that the architecture of a network element is not limited to the components shown in FIG. 1. For example, the network element may include processors or memory not shown in FIG. 1. Further, a network element in accordance with an embodiment of the invention may include many functionality modules.

FIG. 2 shows a flowchart in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIG. 2 may be performed in parallel with any other steps shown in FIG. 2 without departing from the invention.

FIG. 2 shows a method for detecting abnormalities, in accordance with one or more embodiments of the invention. The method of FIG. 2 may be performed by a network element under test (e.g., as part of a quality control routine), and/or during regular operating conditions (e.g., when the network element is deployed). The method described in FIG. 2 may execute for a scheduled duration, or it may execute continuously until terminated.

Turning to FIG. 2, in Step 200, the network element is subjected to a stress test(s), in accordance with one or more embodiments of the invention. Generally, the stress test includes an abnormal use of at least one resource of the network element. An abnormal use may include using an excessive amount of the resource and/or accessing the resource excessively frequently. Resources of the network element include, but are not limited to, processor time, volatile and non-volatile memory and input/output interface bandwidth. One or more of the previously described stress test modules may be selected for execution during the stress test. The type of stress being imposed on the network element is thus customizable. The selected stress test modules may execute simultaneously or sequentially. The executing stress test modules may be selected, for example, to expose the network element under test to commonly and/or rarely encountered loads at an accelerated pace. The network element and/or the stress test module(s) may generate one or more log entries that specify to which stress test(s) the network element is being subjected. A log entry may include the selected stress test module(s) and the timing of the application of the stress. In one embodiment of the invention Step 200 is performed on a network element under test, but not on a network element under regular operating conditions.

In Step 202, the network element is monitored for abnormalities. In a network element under test, Step 202 may be executed in parallel with Step 200, whereas in a network element under regular operating conditions, Step 202 may be executed without Step 200 being executed. In general, monitoring includes monitoring the state of all (or a portion(s)) of the resources on the network element. More specifically, monitoring for abnormalities may be performed by one or more of the previously described abnormality detection modules. The abnormality detection modules to be active in Step 202, in a network element under test and/or in a network element under regular operating conditions, may be selectable.

In Step 204, a determination is made about whether an abnormality was detected. The determination may be made by one or more of the abnormality detection modules of the network element. Although the definition of an abnormality is abnormality detection module-specific, generally an abnormality is detected when a measured performance, obtained from a portion of the network element, deviates from a nominal performance, beyond a specified threshold. The threshold may be set such that the deviation is subtle, thus enabling the detection of abnormalities that do not (yet) cause erroneous behavior of the network element. Abnormality detection module-specific details are provided above, as part of the discussion of the abnormality detection modules.

If an abnormality is detected, the method may proceed to Step 206, and if no abnormality is detected, the method may proceed to Step 208.

In Step 206, the abnormality detected in Step 204 is documented, for example by generating a log entry. Generation of the log entry is optional and may be configurable. For example, the generation of the log entry may only be activated in network elements under test, or it also may be activated during regular operation of the network element. Further, the level of detail being logged may be configurable. Only the type of detected abnormality (e.g., documented by logging the name of the abnormality detection module that reported the abnormality) or additional details may be logged. These additional details may include, but are not limited to, the portion of the network element in which the abnormality was found, the measured performance that triggered the detection of the abnormality, a time stamp associated with the occurrence of the abnormality, and backtrace information.

In Step 208, a determination is made about whether the abnormality detection is complete. Various criteria may be used for determining whether the abnormality detection is complete. For example, the abnormality test may terminate after a specified time interval and/or based on a number and/or type of detected abnormalities, etc. If a determination is made that the abnormality detection is not complete, the method may continue with the execution of Step 200 and/or Step 202. If the abnormality detection is found to be complete, the execution of the method may terminate.

Embodiments of the invention may enable the detection of abnormalities in network elements. Although abnormalities may be benign in most cases and over a long time, thus not noticeably causing a degradation of the network element's performance, they may eventually cause an error or a failure. Systematic monitoring of the network element for these abnormalities may thus allow the detection of problems that may ultimately cause a failure. After the detection of an abnormality, the network element may be modified to eliminate the cause of the abnormality, once the underlying problem has been identified. To facilitate the detection of abnormalities, network elements in accordance with an embodiment of the invention, generate log entries for the detected abnormalities. Because the documented abnormalities are not errors in the operation of the network element but rather warnings that indicate potential problems, the generated log entries may be hidden from the user of the network element (e.g. from the network administrator), thus avoiding unnecessary confusion of the user. Trained service personnel may be aware of the hidden log database and may thus retrieve the log entries to analyze the performance of the network element for potential issues, indicated by logged abnormalities.

In one or more embodiments of the invention, an accelerated detection of abnormalities in network elements is enabled by the use of one or more stress test modules in a network element under test, while the abnormality detection modules monitor the network element for abnormalities. The stress test modules may expose the network element to a range of load conditions at an accelerated pace. While similar types of loads may be encountered during regular operating conditions, exposing the network element to these loads at an accelerated pace may produce abnormalities in less time, thus accelerating the detection of potential failure risks in the network element.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting abnormalities in network element operation,
   the method comprising:
   initiating, by an internal stress test module executing in a network element, a stress test, wherein the stress test comprises instructing the network element to process at least one custom-crafted packet to induce a high processing load on the network element, wherein the high processing load is induced by an address resolution protocol (ARP) cache on the network element being filled at a rate that requires garbage collection on the ARP cache to be frequently performed;
   after initiating the stress test:
   making, by at least one of a plurality of abnormality detection modules executing in the network element, a determination that an abnormality exists in response to monitoring the network element, wherein the detected abnormality is indicative of an underlying problem in the network element; and
   based on the determination, tracking the abnormality.

2. The method of claim 1,
   wherein processing the at least one custom-crafted packet comprises issuing a plurality of custom-crafted packets to a plurality of non-existent destination on a subnet,
   wherein the network element is on the subnet, and
   wherein data is stored in the ARP cache in response to the processing.

3. The method of claim 1,
   wherein the at least one custom-crafted packet is a proxy ARP packet, and
   wherein data is stored in the ARP cache in response to the processing of the proxy ARP packet.

4. The method of claim 1, wherein making the determination that the abnormality exists comprises:
   identifying a process that is executable by a processor of the network element for a time interval; and
   determining that the process was only executed on the processor for a portion of the time interval, wherein the portion of the time interval satisfies a detection threshold.

5. The method of claim 1, wherein making the determination that the abnormality exists comprises:
   determining that a particular task executing on the network element is consuming:
   an amount of memory on the network element that is greater than a first memory threshold, or
   a percentage of the memory on the network element that is greater than a second memory threshold.

6. A network element, comprising:
   a processor;
   a network element operating system comprising functionality modules, an internal stress test module, and an abnormality detection module, wherein the network element operating system is executing on the processor or on a virtual machine executing on the processor;
   wherein the internal stress test module is configured to initiate a stress test, wherein the stress test comprises instructing the network element to process a plurality of custom-crafted packets to induce a high processing load on the network element, wherein processing the plurality of custom-crafted packets comprises issuing at least one of the plurality of custom-crafted packets to a multicast destination with no members;
   wherein the abnormality detection module is configured to:
   after the stress test has been initiated, make a determination that an abnormality exists in response to monitoring the network element, wherein the detected abnormality is indicative of an underlying problem in the network element; and
   based on the determination, tracking the abnormality.

7. The network element of claim 6, wherein processing the plurality of custom-crafted packets further comprises issuing at least one of the plurality of custom-crafted packets to a unicast destination.

8. The network element of claim 6, further comprising:
   a network chip,
   wherein at least one of the plurality of custom-crafted packets comprises an option that forces the network chip to forward the at least one of the plurality of custom-crafted packets to the processor, and
   wherein the processor processes the at least one of the plurality of custom-crafted packets.

9. The network element of claim 6, further comprising:
a network chip,
wherein processing the plurality of custom-crafted packets further comprises attempting to issue at least one of the plurality of custom-crafted packets to a plurality of unresolved multicast destinations,
wherein, in response to the attempting, the at least one of the plurality of custom-crafted packets is forwarded by the network chip to the processor; and
wherein the processor processes the at least one of the plurality of custom-crafted packets.

10. The network element of claim 6, further comprising:
a network chip,
wherein a size of at least one of the plurality of custom-crafted packets forces the network chip to forward the at least one of the plurality of custom-crafted packets to the processor,
wherein the processor processes the at least one of the plurality of custom-crafted packets.

11. The network element of claim 6, further comprising:
a network chip,
wherein processing the plurality of custom-crafted packets comprises attempting to issue at least one of the plurality of custom-crafted packets to a resolved multicast destination,
wherein the at least one of the plurality of custom-crafted packets is configured to be software-forwarded to the resolved multicast destination;
wherein, in response to the attempting, the at least one of the plurality of custom-crafted packets is forwarded by the network chip to the processor; and
wherein the processor processes the at least one of the plurality of custom-crafted packets.

12. The network element of claim 6, wherein making the determination that the abnormality exists comprises:
identifying a process that is executable by the processor for a time interval; and
determining that the process was only executed on the processor for a portion of the time interval, wherein the portion of the time interval satisfies a detection threshold.

13. The network element of claim 6, wherein making the determination that the abnormality exists comprises:
determining that a particular task executing on the network element is consuming:
an amount of memory on the network element that is greater than a first memory threshold, or
a percentage of the memory on the network element that is greater than a second memory threshold.

14. A method for detecting abnormalities in network element operation, the method comprising:
initiating, by an internal stress test module executing in a network element, a stress test,
wherein the stress test comprises instructing the network element to process at least one custom-crafted packet to induce a high processing load on the network element,
wherein processing the at least one custom-crafted packet comprises attempting to issue the at least one custom-crafted packet to a plurality of unresolved multicast destinations,
wherein, in response to the attempting, the at least one custom-crafted packet is forwarded by a network chip on the network element to a processor on the network element; and
wherein the processor processes the at least one custom-crafted packet;
after initiating the stress test:
making, by at least one of a plurality of abnormality detection modules executing in the network element, a determination that an abnormality exists in response to monitoring the network element, wherein the detected abnormality is indicative of an underlying problem in the network element; and
based on the determination, tracking the abnormality.

15. The method of claim 14, wherein making the determination that the abnormality exists comprises:
identifying a process that is executable by a processor of the network element for a time interval; and
determining that the process was only executed on the processor for a portion of the time interval, wherein the portion of the time interval satisfies a detection threshold.

16. The method of claim 14, wherein making the determination that the abnormality exists comprises:
determining that a particular task executing on the network element is consuming:
an amount of memory on the network element that is greater than a first memory threshold, or
a percentage of the memory on the network element that is greater than a second memory threshold.

* * * * *